(12) United States Patent
McKnight (10) Patent No.: US 8,584,456 B1
(45) Date of Patent: Nov. 19, 2013

(54) BISTABLE ACTUATOR MECHANISM

(75) Inventor: Geoffrey P McKnight, Los Angeles, CA (US)

(73) Assignee: HRL Laboratories, LLC, Malibu, CA (US)

( * ) Notice: Subject to any disclaimer, the term of this patent is extended or adjusted under 35 U.S.C. 154(b) by 525 days.

(21) Appl. No.: 12/784,809

(22) Filed: May 21, 2010

(51) Int. Cl.
*H02N 10/00* (2006.01)

(52) U.S. Cl.
USPC ............................................. 60/527; 310/307

(58) Field of Classification Search
USPC ........... 74/490.01; 310/306–308; 60/527–529
See application file for complete search history.

(56) References Cited

U.S. PATENT DOCUMENTS

| | | | |
|---|---|---|---|
| 4,544,988 A | 10/1985 | Hochstein | |
| 4,700,541 A | 10/1987 | Gabriel et al. | |
| 4,806,815 A | 2/1989 | Honma | |
| 4,887,430 A | 12/1989 | Kroll et al. | |
| 5,325,880 A | 7/1994 | Johnson et al. | |
| 5,410,290 A | 4/1995 | Cho | |
| 5,763,979 A | 6/1998 | Mukherjee et al. | |
| 5,977,858 A | 11/1999 | Morgen et al. | |
| 6,019,113 A | 2/2000 | Allston et al. | |
| 6,072,154 A | 6/2000 | Maynard | |
| 6,151,897 A | 11/2000 | Baumbick | |
| 6,169,269 B1 | 1/2001 | Maynard | |
| 6,236,300 B1 | 5/2001 | Minners | |
| 6,272,857 B1 | 8/2001 | Varma | |
| 6,278,084 B1 | 8/2001 | Maynard | |
| 6,279,869 B1 | 8/2001 | Olewicz | |
| 6,318,641 B1 | 11/2001 | Knebel et al. | |
| 6,494,225 B1 | 12/2002 | Olewicz et al. | |
| 6,543,224 B1 | 4/2003 | Barooah | |
| 6,762,669 B2 | 7/2004 | Alacqua et al. | |
| 6,843,465 B1 | 1/2005 | Scott | |
| 6,943,653 B2 | 9/2005 | Hanke et al. | |
| 7,411,331 B2 | 8/2008 | Dubowsky et al. | |
| 2007/0247420 A1 | 10/2007 | Strohband et al. | |
| 2008/0307786 A1* | 12/2008 | Hafez et al. | ...................... 60/527 |
| 2010/0108922 A1* | 5/2010 | Foshansky | ............... 251/129.01 |

OTHER PUBLICATIONS

Yoshikawa, W., Sasabe, A., Tabata, O., Ishida, A., "Vertical Drive Micro Actuator for Haptic Display Using Shape Memory Alloy Thin Film" Papers of Technical Meeting on Micromachine and Sensor System, IEE Japan, L2898B, vol. MMS-05, No. 21-44, 103-108 (2005).
R. Vitushinsky, S. Schmitz, A. Ludwig, "Bistable Thin-Film Shape Memory Actuators for Applications in Tactile Displays", Journal of Microelectromechanical Systems, 18, 186-194, Feb. 2009.
Velazquez, R., Pissaloux, E., Hafez, M., Szewczyk, J., "Tactile Rendering With Shape-Memory-Alloy Pin-Matrix", IEEE Transactions on Instrumentation and Measurement, vol. 57, No. 5, May 2008.

* cited by examiner

*Primary Examiner* — Troy Chambers
*Assistant Examiner* — Terence Boes
(74) *Attorney, Agent, or Firm* — Daniel R. Allemeier; George R. Rapacki (57) ABSTRACT

A parallelogram mechanism is combined with shape memory alloy actuators to produce a bistable mechanism that remains in one of two positions until sufficient energy is added to overcome a threshold. The parallelogram mechanisms may be stacked to form a mechanism with a stroke greater than that of an individual mechanism. The shape memory actuators are connected to the parallelograms to operate antagonistically in that when one is activated the other is passive.

13 Claims, 11 Drawing Sheets

BISTABLE ACTUATOR MECHANISM

STATEMENT REGARDING FEDERALLY SPONSORED RESEARCH OR DEVELOPMENT

This invention was made with Government support under Contract No. HR0011-08-C-0162—"High-damping Negative Stiffness Cellular Materials. The Government has certain rights in the invention.

FIELD OF THE INVENTION

The present invention relates to bistable mechanisms using antagonistic actuators.

BACKGROUND OF THE INVENTION

Smart material actuators provide very scalable actuation properties due to the inherent solid state nature of the actuation force and displacement. However, they also exhibit many limitations and challenges due to the non-linear and field-dependant nature of the force and displacement generation. For example, they can be hard to precisely control, often require continuous power draw to hold position, experience stroke and force decay over lifetimes, and can be damaged when excessively loaded.

One approach to mitigate all of these limitations is to use active materials in combination with another mechanical structure that together provide the necessary functionality.

Bistable Actuator devices are combinations of a bistable mechanism and an actuator to switch the mechanism from one stable state to another. Such devices, while known in the art, suffer from various problems depending on the design. Some designs do not provide a well controlled displacement trajectory, such as a one-dimensional motion, that is desired for a particular application. Some designs are not scalable in that there is an upper or lower limit to the physical size of the device. Others have limited range of motion or a limited ability to exert a force.

For example, SHAPE MEMORY ACTUATOR WITH BI-STABLE OPERATION (U.S. Pat. No. 6,762,669) focuses on mechanistic implementations of bistability that are not scalable due to the use of pivots, pins, springs, mechanical hinges, etc. In addition, achieving a state depends on a spring stretching the shape memory actuator while achieving the alternate state requires the shape memory actuator overcoming the spring. In effect, the operation of the device depends on a balance between the shape memory actuator and the spring, thereby limiting the design options. Other implementations are focused on sensor implementation, such as a thermostat or other temperature sensor, and do not provide the actuation functionality disclosed herein.

U.S. Pat. No. 7,411,331 discloses a concept limited to dielectric elastomer actuation. Such an approach is limited in the range of motion and or the force available. Moreover, the actuation method requires the presence of an energy source to maintain a particular configuration.

As such, there is a need for Bistable Actuation devices that have a large range of travel, can maintain a particular configuration without consuming energy and is scalable.

SUMMARY OF THE INVENTION

In a first embodiment, a bistable mechanism comprising a parallelogram, where the parallelogram comprises two long arms in parallel, two short arms in parallel, and at least one pair of actuators arranged such that the actuators of the pair are antagonistic to each other; and each long arm connected at its extremity to each short arm at its extremity with a hinge, such that a first stable position corresponds to energizing one actuator of the at least one pair of actuators and a second stable position corresponds to energizing the other actuator of the at least one pair actuators.

In another embodiment, the previously described bistable mechanism where the long arms are axially compressible. The long arms may be made of plastic or metal.

In another embodiment, the previously described mechanism where the hinge is a flexure hinge.

In another embodiment, any of the previously described embodiments where the actuators comprise one or more shape memory alloys, possibly including a Nickel Titanium alloy and the ratio of the short arm length to the long arm length is less than 0.4 or even between 0.05 and 0.25.

In another embodiment, the flexure hinge may have a thickness of the long arm at a pivot point half or less, the thickness of the long arm otherwise.

In another embodiment, a bistable mechanism comprising two parallelograms previously described wherein the two parallelograms have a short arm in common. In a further embodiment, the actuators of this embodiment comprise one or more shape memory alloys. These embodiments may have parallelograms where the ratio of each short arm to a corresponding long arm is between 0.05 and 0.25.

In another embodiment, a multistable mechanism comprising a plurality of the embodiment comprising two mechanisms previously described, wherein each mechanism has a stroke and the stroke of the two mechanisms combined is substantially equal to the sum of the individual strokes.

In another embodiment, a bistable mechanism comprising means for limiting the unenergized state of the mechanism to one of two stable positions; and means for switching the stable positions such that the state of the mechanism does not change from a first stable position to a second stable position until sufficient energy is added to the means for switching to overcome a threshold.

BRIEF DESCRIPTION OF THE DRAWINGS

The accompanying drawings, together with the specification, illustrate exemplary embodiments of the present invention, and, together with the description, serve to explain the principles of the present invention.

DETAILED DESCRIPTION

The aforesaid problems may be at least partially solved by integrating an actuation mechanism into a bi-stable mechanism such that the bi-stable mechanism constrains the possible shapes while the actuation mechanism provides the user controlled energy to shift from one state to another. By making the actuation mechanism comprise antagonistically arranged Shape Memory Alloys (or their functional equivalent) the device may retain a particular shape or state even in the absence of power.

In the following detailed description, only certain exemplary embodiments of the present invention are shown and described, by way of illustration. As those skilled in the art would recognize, the described exemplary embodiments may be modified in various ways, all without departing from the spirit or scope of the present invention. Accordingly, the drawings and description are to be regarded as illustrative in nature, and not restrictive.

The description herein may be broken down into a description of the bi-stable structure itself, the actuation mechanism, and the integration of the two.

A Bistable mechanism is one that has two stable configurations. The mechanism can be switched from one stable configuration to another only by applying work beyond a threshold to the mechanism. Energy inputs below the threshold will not cause the mechanism to switch state. Moreover, the state of the mechanism remains fixed until sufficient energy is supplied. Hence the mechanism is stable when there is no energy input.

The fundamental structure of the embodiments of this technology is a box or parallelogram with shape memory alloy actuators connecting opposite corners. The arms or sides of the parallelogram are preferably compressible. The opposing vertices of the box are preferably connected with Shape Memory Alloy (SMA) actuators such that when one of the actuators is activated it draws the opposite corners together. If one (short) arm is considered fixed, the drawing together of opposite corners will change the position of the unfixed end of the box. One significant advantage of the box or parallelogram arrangement is the motion of the box is one dimensional when the SMA actuator is activated. This motion is in translation as opposed to a rotation.

The integration of the bistable device structure and the actuator, conceptually, only requires the actuator be free running between two anchored end points. In between the endpoints the actuator (for example, a wire) may weave through the structure as needed, and may be connected to the structure in such a way as to allow the force to applied at the vertices of the parallelogram or box.

Many variations on the structure are possible. For example, the arms of the parallelogram may be springs; each arm may comprise two or more curved segments connected at the ends in parallel such that when compressed, the curved segments bend or buckle.

Figure 1:
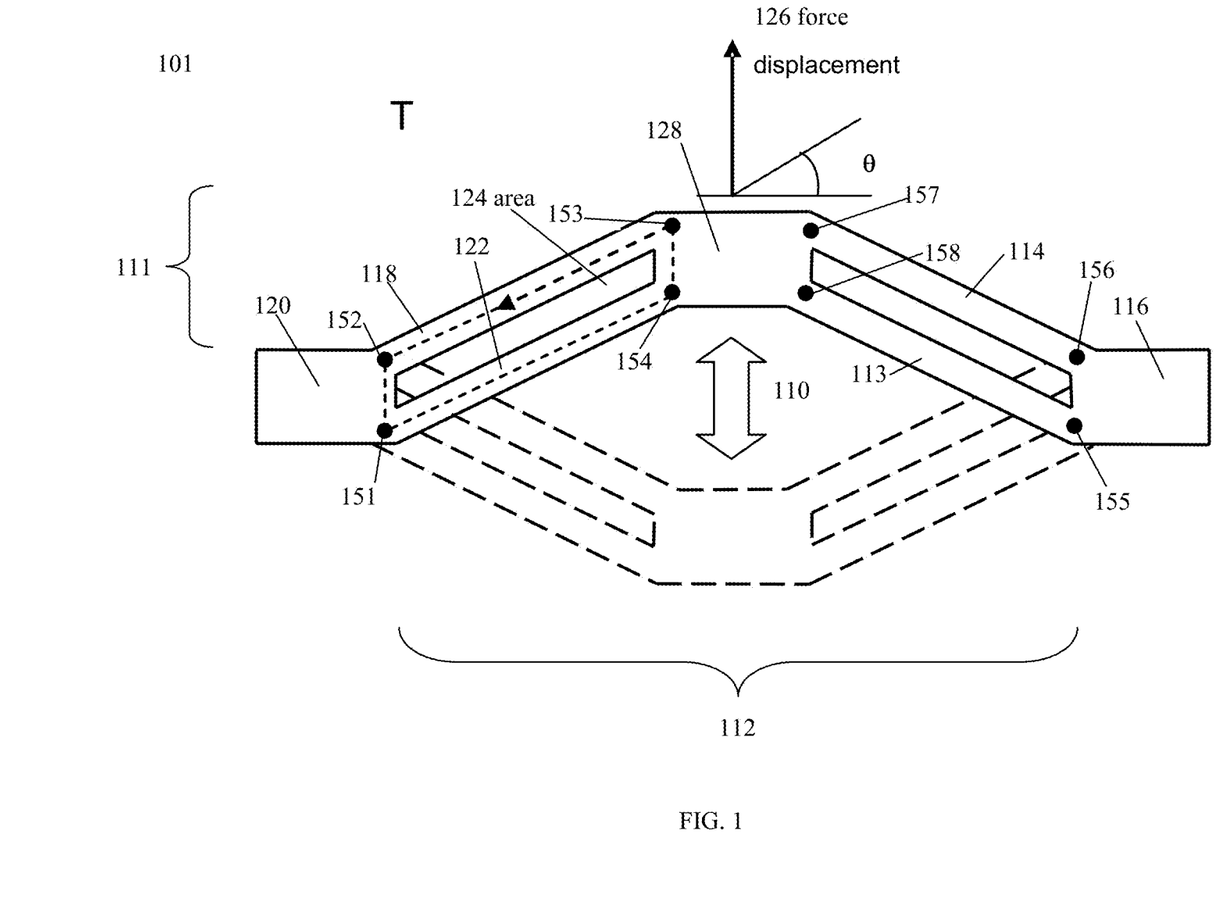
FIG. 1 Shows the basic principle of the bi-stable mechanism disclosed in this invention. The compressible dual arms on each side confine the motion to one degree of freedom while simultaneously providing integral volume for actuation elements.

FIG. 1 shows one embodiment of a bistable mechanism suitable for integration with an actuator. The mechanism comprises at least two parallelograms of arms connected to allow the arms to pivot or rotate in the theta direction yet maintain the orientation of a central block 128. In FIG. 1 the arms are 118, 122, 113 and 114 and may be alternatively described as sides or members. The arms 118 and 122 of the first parallelogram are connected at the pivot points 151 to 154, as shown, to a left block 120 and a central block 128. The arms 114 and 113 of the second parallelogram connect to the central block 128 and a right block 116 at the pivot points 155-158. Given an initial starting position 111 of the arms 118, 122, 113 and 114, if one allows the spacing between blocks 120 and 116 to first increase and then decrease, one can envision the central block moving along the direction indicated by 110 to a new stable configuration 112. If the arms 118, 122, 113 and 114 are compressible then the spacing between blocks 120 and 116 may be fixed. In that embodiment, toggling the structure from an initial stable state to another requires compressing the arms 118, 122, 113 and 116 by some actuator. Note that in the change from one stable configuration to another, the central block 128 translates only in the up or down directions 110 of FIG. 1. The block 128 does not rotate. Furthermore, the block 128 may be treated as a short arm of the parallelogram in which case the block 128 is common to both parallelograms in FIG. 1. The angle theta in FIG. 1 refers to the change in angle of the parallelogram arms 118, 122, 113 and 114.

In one preferred embodiment the arms 118, 122, 113 and 114 comprise compressible springs. Alternative embodiments use arms comprising polycarbonate, nylon, PET (Polyethylene Terephthalate), PEEK (polyaryletherketone), epoxy, thermoplastics generally, and thermoelastomers generally, other non-lossy polymers or other plastics known in the art. Fibrous fillers for these polymers including glass and carbon fibers can increase the stiffness of these systems. In another embodiment, the arms may comprise MetGlass, an amorphous metal that behaves like a polymer. The arms 118, 122, 113, and 114 are not necessarily homogeneous. The composition and structure of the arms 118, 122, 113, and 114 may vary with the length of the arms 118, 122, 113, and 114. For example, while the arms 118, 122, 113, and 114 may comprise a polymer, fiber filler may be added in the central region to stiffen the arm 118, 122, 113, and 114. This would allow the ends of the arms 118, 122, 113, and 114 to remain more flexible. Alternatively the arms 118, 122, 113, and 114 may comprise combinations of the materials above such as metals, metglas and polymers.

A number of embodiments are available for the pivot points 151-154 and 155-158. By way of example and not limitation, the pivot points may be hinges, flexures, cup and socket arrangements, axle and bearings, or similar structures that allow the arms 118, 122, 113 and 114 to rotate relative to blocks 120, 128 and 116.

Figure 2A:
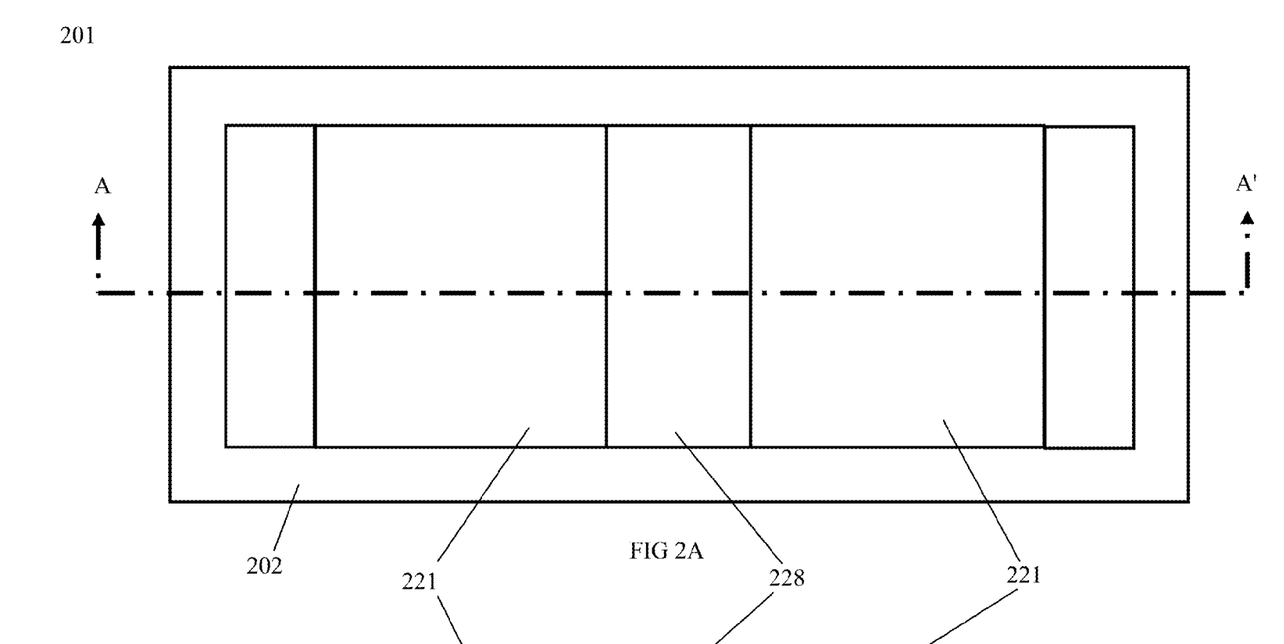
FIG. 2 shows the bistable mechanism combined with a frame to form a bistable structure.
Figure 2B:
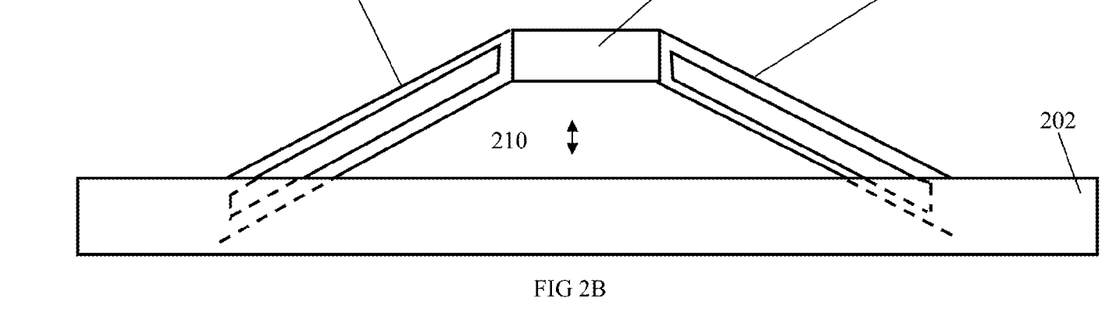

FIGS. 2A and 2B show the parallelogram structure of FIG. 1 integrated with a frame 202 to maintain the separation between left block 120 and right block 116. The frame 202 not only maintains the separation between 120 and 116 but also allows the bistable structure 101 to pass through the frame. The frame 202 may be omitted altogether if the functionality of maintaining a fixed separation between left block 120 and right block 116 is provided by some other arrangement. For example, if the bistable structure 101 is installed into a larger structure providing the support for blocks 120 and 116 then a frame 202 is unnecessary. The cross section A-A' marked in FIG. 2A is shown in FIG. 3 in more detail.

In another alternative embodiment, the frame 202 does not fix the separation between blocks 120 and 116. Instead, frame 202 allows the separation between blocks 120 and 116 to vary as if they were connected by a spring. With this arrangement the arms of the parallelogram 118, 122, 113 and 114 do not have to be compressible to allow the structure 101 to switch from one stable state 111 to a second stable state 112 shown as a dotted outline of the parallelograms and central block 128 in FIG. 1.

One can imagine the two boxes or parallelograms 221 connected together as shown in FIGS. 2A and 2B allowing the motion 110 in one dimension, up and down in FIG. 1. A top view of FIG. 1 shown in FIG. 2A would show the two boxes or parallelograms 221 to be in the same line. However, more than two boxes or parallelograms may be connected such that the top view would look like a cross or a triad with three boxes which may be spaced uniformly. These concepts are shown in FIGS. 4A and 4B where the parallelograms 421 are not necessarily of uniform size or symmetrically placed. The outer frame 420 and center block 428 correspond to 202 and 128 in FIG. 3. Similarly FIG. 4C shows an even number of parallelograms or boxes is not needed nor does the box 421 have to be rectangular except in cross section as shown in FIG. 4D. The device 404 shown in FIG. 4D may comprise two nested concave dish shaped elements with SMA actuators connecting opposite corners of a cross section. It is the cross section which will have the parallelogram or box structure. When one actuator is energized the device in FIG. 4D is concave down. When the other SMA actuator is energized the device 404 is concave up. In cross section the device 404 appears the same as that shown in FIG. 1.

Figure 3:
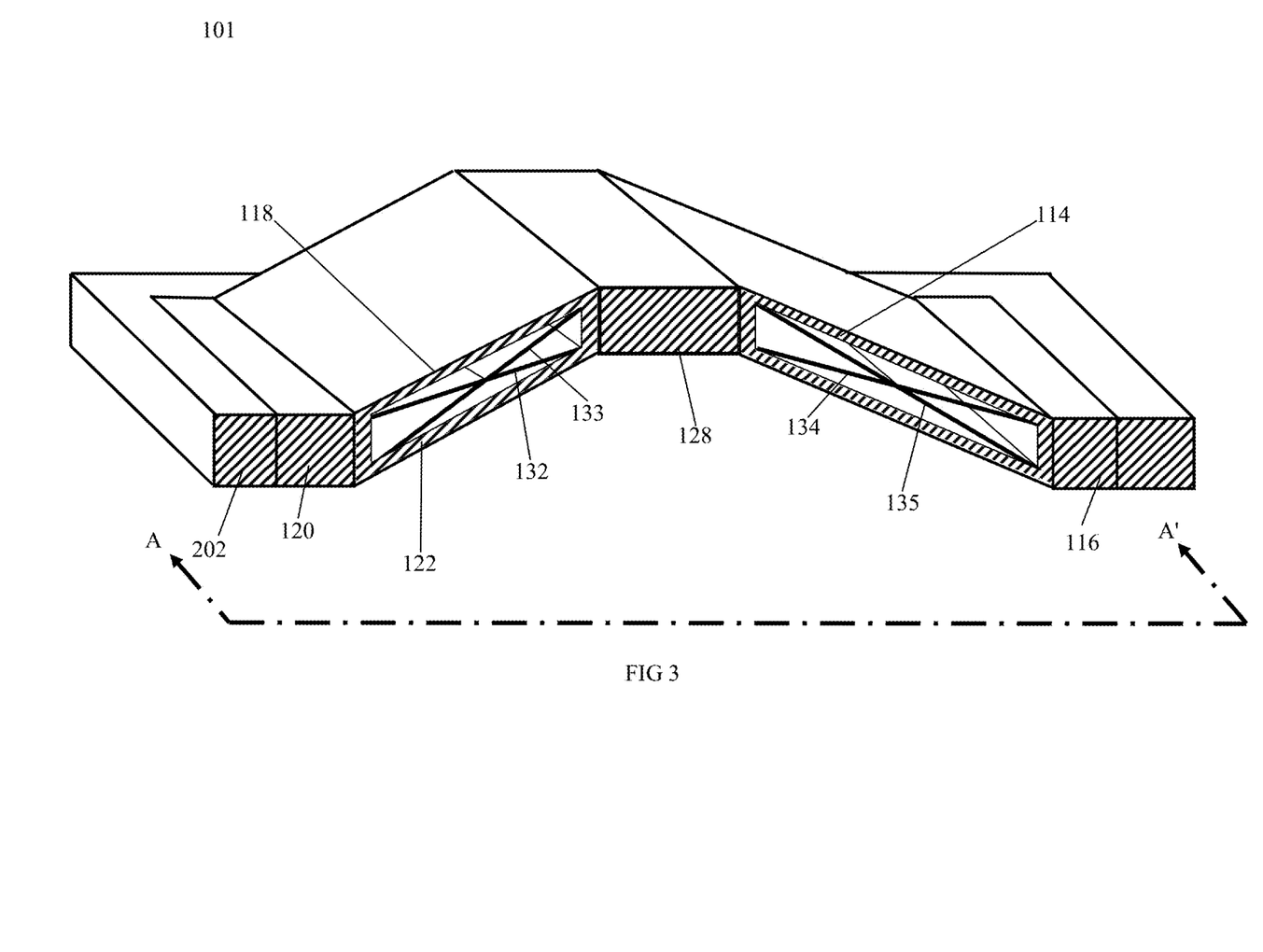
FIG. 3 shows a perspective view of the bistable structure of FIG. 2.
Figure 4A:
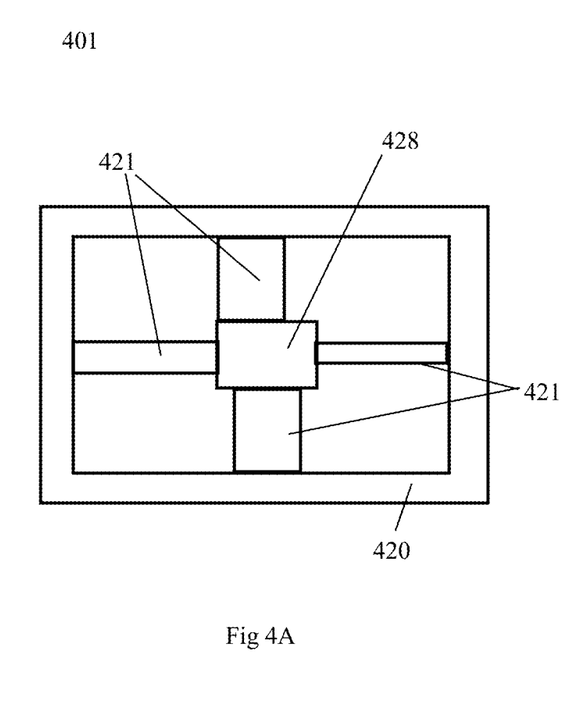
FIG. 4A-D show alternative arrangements of the bistable structure with various orientations and number of parallelograms, including a single circular parallelogram in FIG. 4D.
Figure 4B:
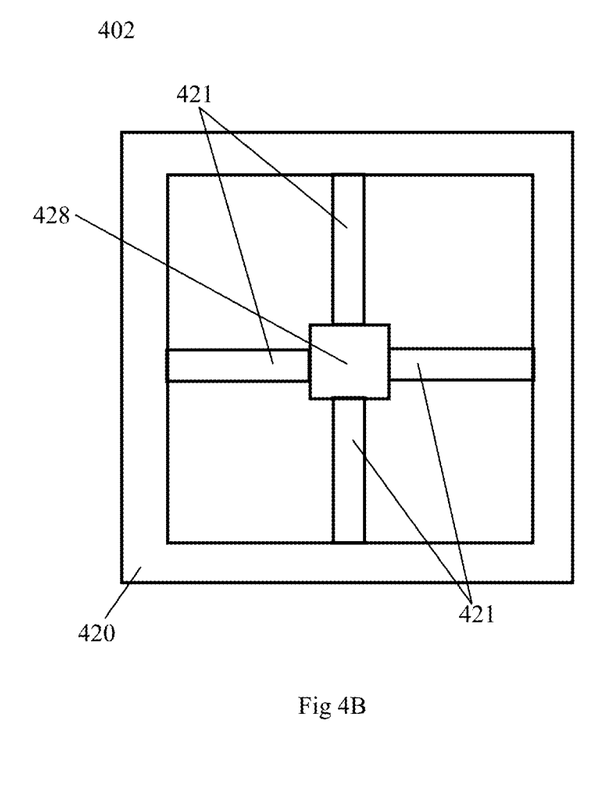
Figure 4C:
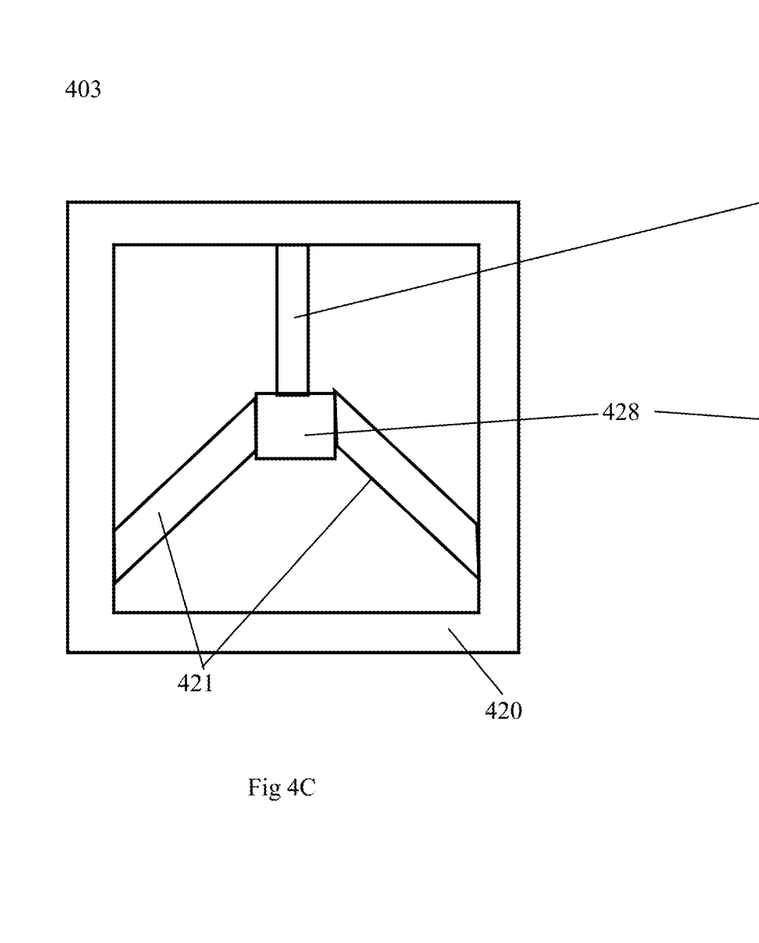
Figure 4D:
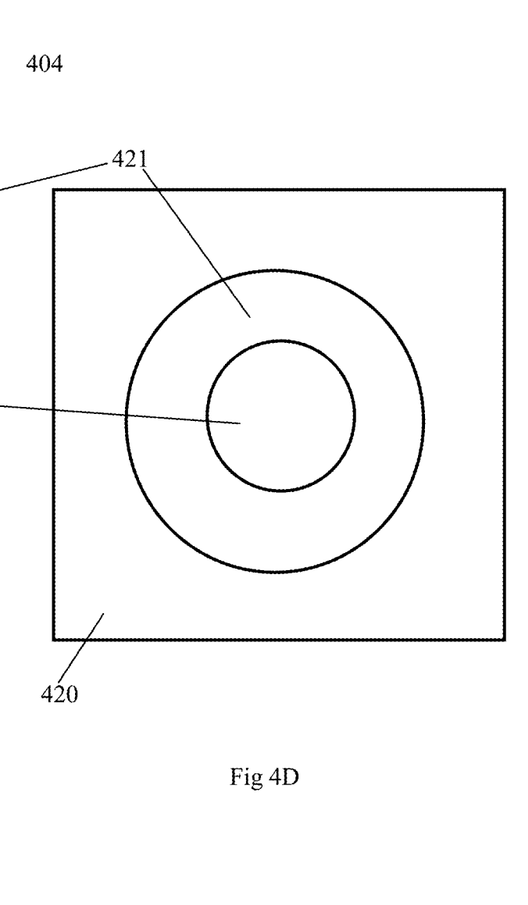

The perspective view of FIG. 2 shown in FIG. 3 shows the functional relationship between the structure 101 and the actuation elements 132, 133, 134 and 135. The actuation elements have been shown as lines for clarity and not to imply a limitation. One may envision these actuators as wires connecting opposite corners such that if wires 133 and 135 are under tension and wires 132 and 134 are allowed to stretch then the bistable element 101 will toggle its position from 111 to 112 (in FIG. 1) providing the tension in the wires is sufficient to compress the arms 118, 122, 113 and 114. The actuator elements 132-135 have been described as wires without implying a limitation. The actuator elements 132-135 could be rods, beams, sheets or any other shape and material that can exert a tensile force when activated. In one preferred embodiment, the material for the actuator is a Shape Memory Alloy.

Figure 5:
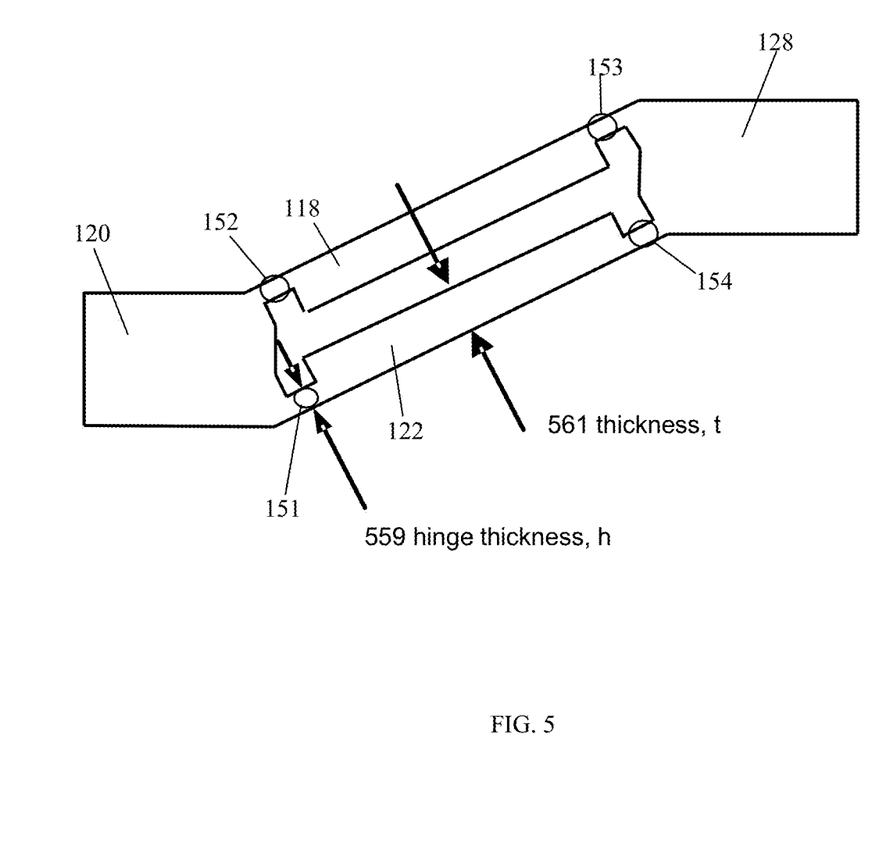
FIG. 5 Shows the detail of the virtual hinge concept using a thinner section of the axial member to support large deflections and a thicker section in the inner section to prevent bending deformation in the member.

One preferred embodiment of the parallelogram structure 101 of FIG. 1 comprises flexures or flexible hinges for the pivot points 151 to 158. These flexible hinges or virtual hinges are thinner regions (indicated by circles) of the arms or axial members that can flex through the necessary angle while remaining in an elastic range of the material. This is shown in FIG. 5 where the hinge thickness 559, h, is generally less than t/2 where t 561 is the otherwise thickness of the arm 118, 122, 113 or 114. Using simple beam theory, the design of this section can be prescribed such that the peak strain encountered is well within the fatigue limit of the material being used. Many materials may be considered for this component including polymers and polymer composites as well as metals. Ideally, a large strain capacity, and low creep are desired so that the stroke can be maximized with the virtual hinge and the structure can remain stable through its stroke. By stroke is meant the change in position or travel 110 between the two stable positions shown in FIG. 1. A stable position is one at the extreme end of the stroke and persists after the actuator is no longer energized. Preferred polymers include but should not be limited to polycarbonate, nylon, PET (Polyethylene Terephthalate), PEEK (polyaryletherketone), epoxy, thermoplastics generally, thermoelastomers generally, and other non-lossy polymers. Fibrous fillers for these polymers, including glass and carbon fibers, can increase the stiffness of these systems. Aluminum, steel, or titanium alloys are excellent choices for flexures 151-158 made of metals. Metallic glasses (or Metglas) also have attractive properties for flexures 151-158 due to their good stiffness and high elastic strain.

Functionally the bistable mechanism allows compressing the arms 118, 114 or 113 and 122 of the mechanism initially and as they rotate through the middle position and then relaxing them as they move to the second stable position.

Figure 6:
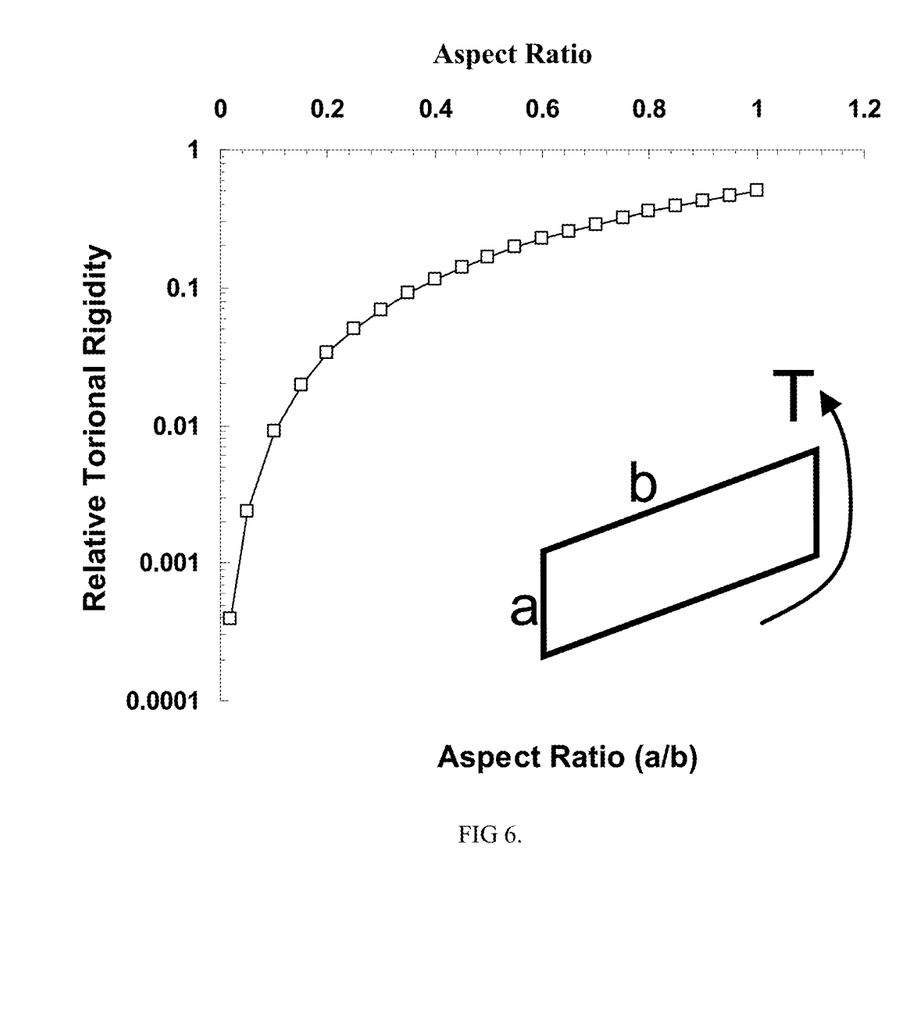
FIG. 6 shows the enhanced torsional rigidity gained with a closed section as a function of aspect ratio. This effect strongly limits the motion of the bistable mechanism to a single degree of freedom

FIG. 6 shows the increase in torsional rigidity for various aspect ratios a/b based on closed thin walled torsion member calculation. This result shows the dramatic increase in torsional rigidity T with small increases in enclosed area (corresponding to larger aspect ratios) of the closed section formed by the arms 118, 122, 113, and 114, the central block 128 and either the left block 120 or right block 116. While it is not intuitive that torsional rigidity would increase the stability of the single degree of freedom in this type of system, if one considers rotating the central block 128 about the angle theta in FIG. 1, it is seen to be equivalent to rotating the parallelogram section 124. As a consequence, increasing the resistance to torsion of the parallelogram will largely confine the motion of the block 128 to a non-rotational translation. This is similar to the idea of a torsion box that provides significant increase in torsional rigidity with a minimum of mass. In addition, the parallelogram or box structure provides two stable positions. In effect the potential energy well is deeper because the central block 128 cannot rotate and induce a bending mode in the arms 118, 122, 113, and 114 of the mechanism. Preferred aspect ratios are between 0.05 and 0.25.

Figure 7:
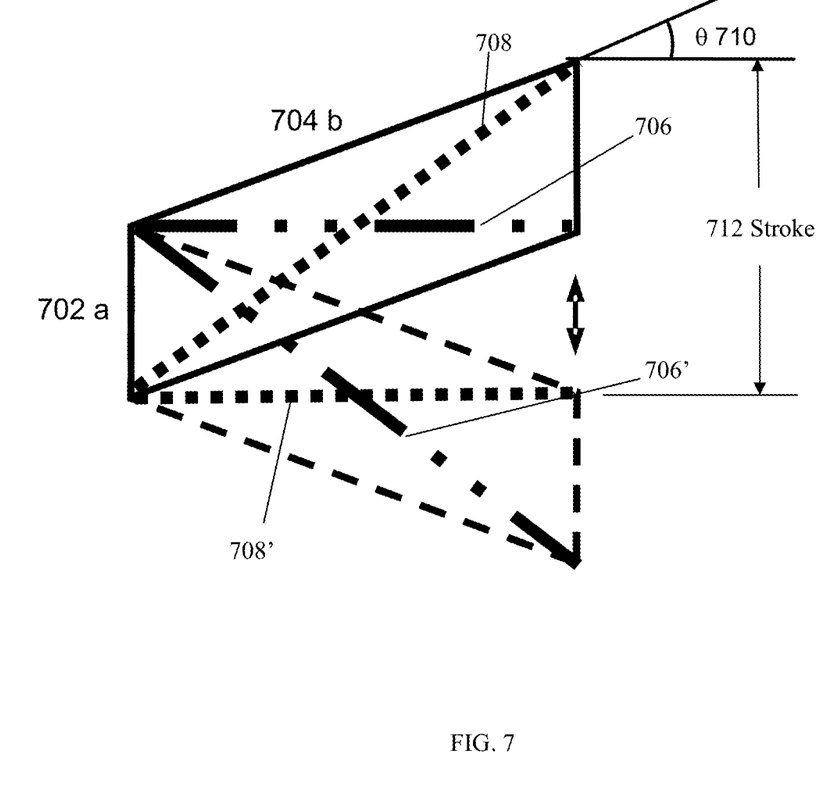
FIG. 7 illustrates the shearing of the double arm cell and integration of actuation members. The strain is a function of the initial inclination angle as well as the aspect ratio of the parallelogram.

FIG. 7 shows the actuator integrated with the bistable mechanism. There is a cooperative relationship between the bistable mechanism and the actuator. Alternative stable configurations are shown in FIG. 7 where the lines 706 and 708 represent integrated solid state actuators such as shape memory alloys. Each of the two actuators 706 and 708 can help drive the structure from one stable position to another shown as 706' and 708'. For example, considering the 708 actuation element in the upper position, if the 708 actuator is reduced in length (contraction) the structure will be pulled towards the lower position until is can snap through to the lower position. The difference between the upper position and the lower position is the stroke 712 of the bistable mechanism. The 706 actuator can assist in this transition from upper to lower by extending and pushing the corner away. In effect, these two actuators act to create a local shear load that can shear the box structure from one stable position to another. In general, one may not require both of the actuators to achieve this effect. However, if the actuator characteristics are such that it can only supply a tensile force such as in a SMA wire form, it will be necessary to have two antagonistic actuators to drive the bistable structure forwards and backwards. When the actuators are configured antagonistically one actuator has to relax or extend when the other is activated to be in tension. If both actuators were activated concurrently, and assuming each provided the same tension, the state of the mechanism would not change. The force requirements are directly related to the stiffness of the bistable structure which is a function of the material and design, in particular the compressibility of the arms 118, 122, 113, and 114 of the mechanism. This can be varied according to simple design guides that assume purely axial strain in the axial members.

Figure 8:
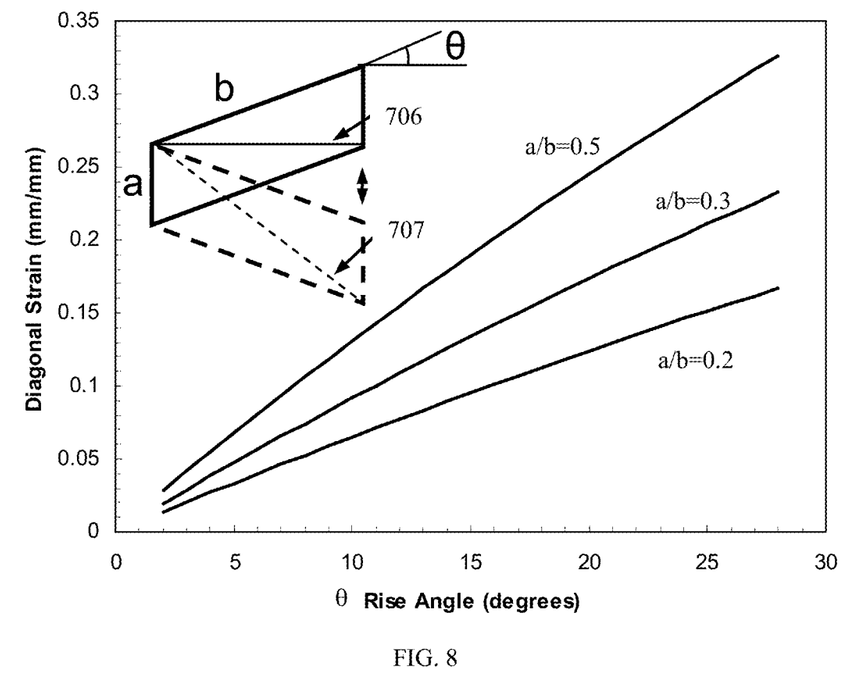
FIG. 8 Plots the effective strain required for activation from one state to another as a function of rise angle and aspect ratio.

FIG. 8 shows the strain required to move from one stable position to another as a function of the initial free stress rise angle theta and the aspect ratio a/b. In the ratio a/b, "a" is the length of the short arm and "b" is the length of the long arm. The chart shows that increasing rise angle theta requires a larger stroke which makes sense as this will provide larger displacement amplitude. Looking at aspect ratio, FIG. 8 shows that the strain increases with decreasing aspect ratio for a fixed initial rise angle. Since most active material actuators are strain limited, preferred embodiments have lower aspect ratios (more rectangular, less square) for the shear box. For example, using a shape memory alloy wire, a preferred embodiment uses 4-5% strain for good lifetime. Using this guide, a preferred embodiment uses an aspect ratio of 0.2 and an initial rise angle of 6-7 degrees. Using helical coils or other amplification techniques will allow greater rise angles to be achieved because the effective strain is increased.

Actuators 706 and 708 are energized alternatively to cause the actuator to return to its original state. Energizing may be by heating the actuator 706, 708 or by passing a current through the SMA to cause heating of the actuator 706, 708

Figure 9:
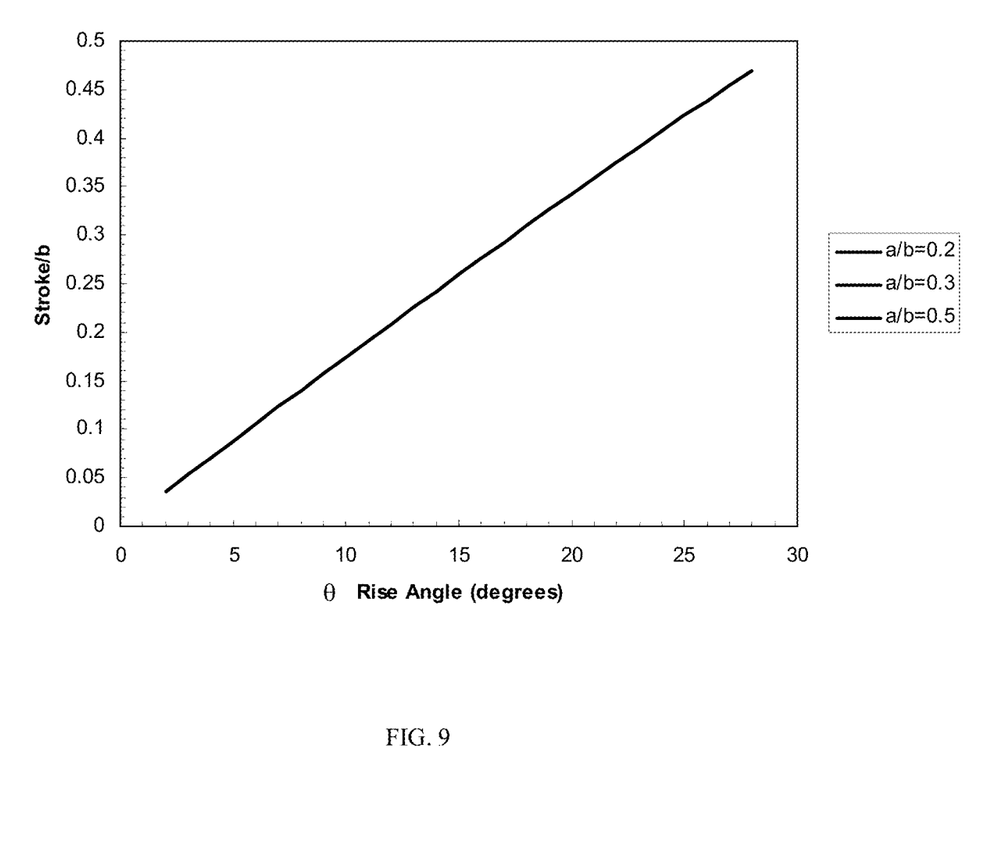
FIG. 9 Shows the vertical stroke of the bi-stable actuator/per length as a function of rise angle and aspect ratio.

FIG. 9 shows the project vertical stroke for a 1 degree of freedom system based on the shear box geometry. FIG. 9 shows that aspect ratio does not affect stroke—only the initial free stress inclination angle. By altering the initial rise angle, different values of stroke per unit of base footprint width (b) are achievable. In a preferred embodiment, a rise angle of 10 degrees will provide approximately 10% vertical stroke as compared to the ½ base width.

Figure 10A:
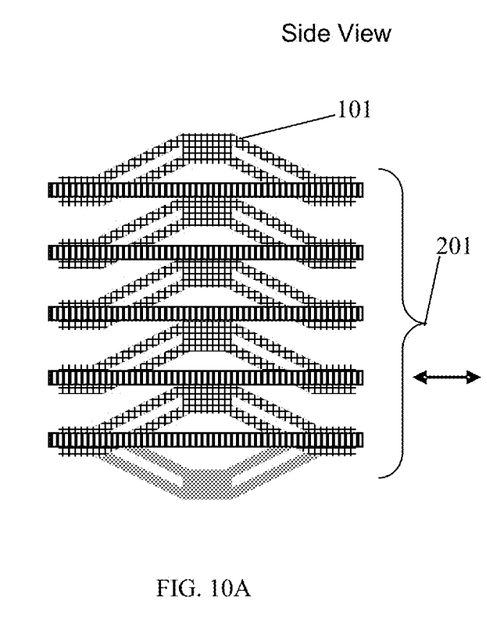
FIGS. 10A, 10B and 10C show the concept for stacking of actuator units to increase stroke and allow for intermediate stable positions using combinations of bistable mechanisms.
Figure 10B:
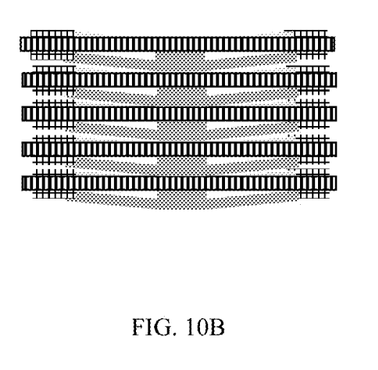
Figure 10C:
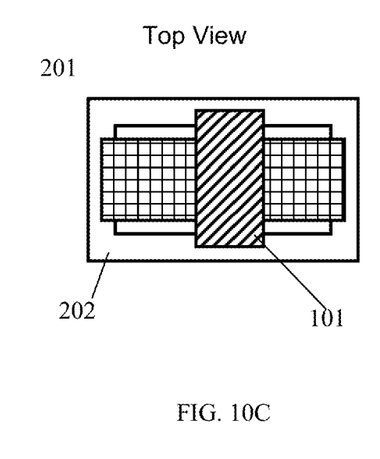

Another aspect of the use of bistable actuation is the combining of bistable actuators in a stack so that intermediate positions may be achieved. FIG. 10A shows this concept with 5 actuators tied together to create a single stack. To support the snap through element 101, an open frame 202 has been added. The function of the frame is simply to provide a tensile counterforce to the compressive forces generated by the snap through elements (shown in green.) For clarity, the actuation elements have been omitted but these would be included along the diagonals as shown in FIG. 3 in one embodiment. While only the extreme positions are shown in 10A and 10B, 2**N positions can be achieved using this approach where N is the number of units stacked together.

Shape memory alloys are metals that return to some original shape when heated. If the alloy is stretched while cool, it retains its final cool shape until reheated. When reheated is exerts a tensile force as it returns to its original shape. When formed into wires, such alloys make effective actuators.

The actuation materials used in this device can come from a family of active materials and other actuation technologies. Essentially any actuation device that can be made to produce a tensile or compressive force can be used. However, the actuator must be able to support some level of tension. The preferred embodiments use actuators with relatively large stroke or effective strain. Shape memory alloy materials are the preferred actuator due to the high effective energy density of these systems which allow a relatively stiff actuator to be constructed. They exhibit good contraction strain on activation. Activation is by heating the SMA either directly or by passing an electrical current through the SMA. The Nickel Titanium family of SMAs are particularly preferred though other formulations would be suitable as well. While piezoelectric materials are not inherently suitable for this type of device, when used in a bending configuration such as the Thunder actuator (Face International Corp), they would be suitable. Some hybrid actuation systems such as McKibben pneumatic and hydraulic actuators may also be suitable for this device.

Various embodiments of connecting the SMA to the vertices of the parallelogram structures are contemplated in the present invention to produce an antagonistic arrangement of SMA actuators. An antagonistic arrangement of SMA actuators means that when the SMA actuator is activated such that is contracts, its antagonistic partner will be stretched Equivalently, an antagonistic arrangement of actuators means if two antagonistic actuators are energized together they will work at cross purposes. For example, the SMA may connect diagonally opposite vertices of the parallelogram structure 101 as shown in FIG. 3. The SMA actuators 132, 133, 134, and 135 may connect the diagonally opposite vertices in the same plane as the arms 118, 122, 113, and 114 or the vertices may be connected out of the plane defined by the arms, essentially the SMA actuator zig-zags between vertices. Another alternative has the SMA actuator snaking from one vertex to another.

While the invention has been described in connection with certain exemplary embodiments, it is to be understood by those skilled in the art that the invention is not limited to the disclosed embodiments, but, on the contrary, is intended to cover various modifications included within the spirit and scope of the appended claims and equivalents thereof.

What is claimed is:

1. A bistable mechanism comprising:
   a parallelogram;
   the parallelogram comprising two long arms in parallel, two short arms in parallel, and at least one pair of shape memory alloy actuators arranged such that the actuators of the pair are antagonistic to each other;
   one actuator of the pair connected between a first pair of opposite vertices of the parallelogram;
   the other actuator of the pair connected between a second pair of opposite vertices of the parallelogram; and
   each long arm connected at its extremity to each short arm at its extremity with a hinge;
   such that a first stable position corresponds to energizing one actuator of the at least one pair of actuators and a second stable position corresponds to energizing the other actuator of the at least one pair actuators.

2. The mechanism of claim 1 wherein the two long arms are axially compressible.

3. The mechanism of claim 1 wherein the two long arms comprise plastic.

4. The mechanism of claim 1 wherein the two long arms comprise metal.

5. The mechanism of claim 1 wherein each hinge is a flexure.

6. The flexure hinge of claim 5 wherein a thickness of the long arm at a pivot point is half or less, a thickness of the long arm otherwise.

7. The mechanism of claim 1 wherein one shape memory alloy is a Nickel Titanium alloy.

8. The mechanism of claim 1 where the ratio of the short arm length to the long arm length is less than 0.4.

9. The mechanism of claim 8 where the ratio of the short arm length to the long arm length is between 0.05 and 0.25.

10. The mechanism of claim 9 wherein each hinge is a flexure.

11. A bistable mechanism comprising two parallelograms of claim 1 wherein the two parallelograms have a short arm in common.

12. The bistable mechanism of claim 11 wherein the actuators comprise one or more shape memory alloys formed into a wire shape.

13. A multistable mechanism comprising at least two mechanisms of claim 11 wherein each mechanism has a stroke and the stroke of the two mechanisms combined is substantially equal to the sum of the individual strokes.

* * * * *